Feb. 3, 1959 S. T. JOLLY 2,872,530

MAGNETIC RECORD TRANSDUCER

Filed June 2, 1955 2 Sheets-Sheet 1

INVENTOR.
Stuart T. Jolly
BY Morris A. Rabkin
ATTORNEY.

INVENTOR.
Stuart T. Jolly
BY Morris A. Rakin
ATTORNEY.

United States Patent Office 2,872,530

Patented Feb. 3, 1959

2,872,530

MAGNETIC RECORD TRANSDUCER

Stuart T. Jolly, Collingswood, N. J., assignor to Radio Corporation of America, a corporation of Delaware Application June 2, 1955, Serial No. 512,756

6 Claims. (Cl. 179—100.2)

This invention relates to magnetic recording, and more particularly to improved magnetic record transducers for multitrack operation.

There are instances when it is desirable to have a magnetic record transducer unit which is capable of handling, without mutual interference, information recorded on several closely spaced, parallel record tracks. One example of apparatus where such transducer units are desirable is a computer system wherein data is stored as magnetic impulses on a magnetic record member. In such apparatus, it is important that the signal translating gaps of the several head members comprising the transducer unit be accurately positioned with respect to each other to minimize the occurrence of errors in the reproduced data. It is also a desirable quality in such transducer units that they be readily produced in numbers with a degree of accuracy to render the units interchangeable.

It is, accordingly, an object of the present invention to provide an improved magnetic record transducer unit for use with multitrack magnetic records wherein the several head elements comprising the transducer unit are very closely spaced.

It is another object of this invention to provide a magnetic record transducer unit as set forth which is characterized in that improved means are provided to prevent, or at least reduce to a minimum, flux linkages between adjacent head elements.

It is a further object of this invention to provide a magnetic record transducer unit which is susceptible of accurate positioning of the signal translating gaps of the several head elements with respect to each other.

Yet another object of the present invention is the provision of a magnetic record transducer as set forth which is characterized in that it is readily susceptible of production in numbers without sacrificing quality of response or accuracy in assembly.

In accomplishing these and other objects, there has been provided, in accordance with the present invention, a magnetic transducer unit which is formed of a number of closely spaced, parallelly arranged head elements. Each of the head elements comprises a two part laminated structure with each part including a stacked laminated core portion and a pair of non-magnetic metal spacers, one at each side of the laminated core portion. Of the two parts, one part comprises a signal coil leg while the other part comprises a magnetic return path. The back surface of each of the two parts, which surface is remote from the signal gap, is machined and dressed to provide an indexing surface. These surfaces are placed in a jig and the gap faces are accurately machined and polished. When these head elements are assembled into a multitrack transducer unit, the gaps may be accurately positioned with respect to each other by indexing the back surfaces of the head elements. The separate head elements are separated by a unitary magnetic shield member which is contoured to accommodate a signal coil on the coil leg of the head element.

A better understanding of this invention may be had from the following detailed description when read in connection with the accompanying drawings, in which.

Figure 1:
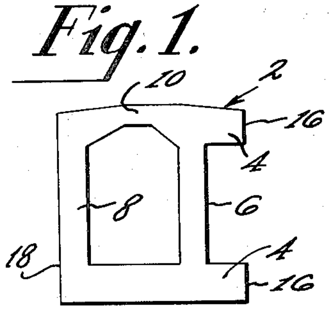
Fig. 1 is an elevational view of a basic core lamination according to the present invention.

Referring now to the drawings in more detail, there is shown in Fig. 1 a core lamination 2 which may be punched from relatively thin magnetic sheet material such as Mumetal. The material may, for example, be on the order of 0.006 of an inch in thickness. The core element 2 is made substantially in the shape of a hollow rectangle with a pair of positioning tabs 4 (to be more fully described hereinafter) extending from one side of the hollow rectangle. The leg of the core element 2 which lies between the two tabs 4 is the leg about which a signal coil is to be wound. Thus, this leg may be designated as a coil leg 6 while the other leg may be described as a magnetic return path leg 8. The upper portion of the core section between these two legs 6 and 8 is tapered from an area of maximum thickness adjacent the two legs toward an area 10 of minimum thickness adjacent the center of the top surface. The area 10 comprises a section of appreciable length which is of uniform cross sectional area. This feature will be more fully discussed hereinafter.

Figure 2:
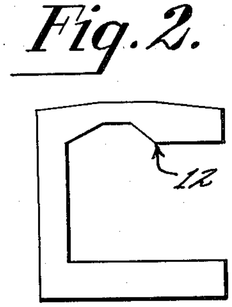
Fig. 2 is an elevational view of a non-magnetic head element spacer in accordance with the present invention.

In Fig. 2, there is shown a non-magnetic spacer element 12. This spacer element conforms in size and configuration to the core element 2 shown in Fig. 1 with the exception that the portion which corresponds to the coil leg 6 of the core element is omitted from the spacer element. This permits closer coupling between the core and the associated coil when the apparatus is assembled. The spacer element 12 may be punched from such conductive, non-magnetic material as beryllium copper sheet on the order of 0.004 of an inch thick.

Figure 3:
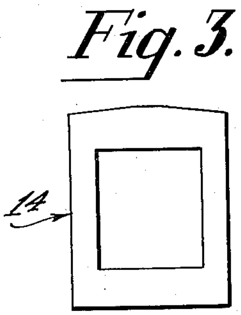
Fig. 3 is an elevational view of a transducer end spacer constructed of non-magnetic material and in accordance with the present invention.

In Fig. 3, there is shown an end spacer 14. The end spacer 14 is made in the form of a hollow rectangle and may be punched from a sheet of conductive, non-magnetic material such, for example, as beryllium copper on the order of 0.02 of an inch thick. This end spacer will be discussed more fully with reference to Figs. 10 and 11.

Figure 4:
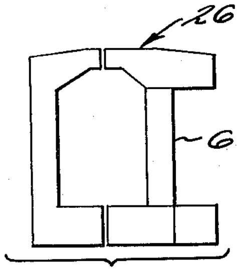
Fig. 4 is an elevational view of a head element at an intermediate stage in the production of a magnetic transducer according to the present invention.

In Fig. 4, several of the core elements 2 of Fig. 1 are shown formed into a laminated core along with two of the spacer elements 12 shown in Fig. 2. By way of example, four of the core elements may be cemented together with one of the spacer elements 12 secured to each end. This may be more clearly seen by referring to Fig. 7. Using a suitable cement, these six members are bonded into a unitary structure. Thus bonded, the ends 16 of the tabs 4 are machined to produce an indexing surface. Similarly the edge 18 of the magnetic return path leg 8 is also machined in a plane parallel to the plane determined by the finished ends of the tabs 4. This provides a second indexing surface. The head element is then servered into parts along a line substantially bi-secting the area of uniform thickness 10 to which reference was made in the discussion of the core elements shown in Fig. 1. One of the parts, including the coil leg 6, is then substantially I-shaped, while the other part, including the magnetic return path leg 8, is substantially C-shaped.

Figure 5:
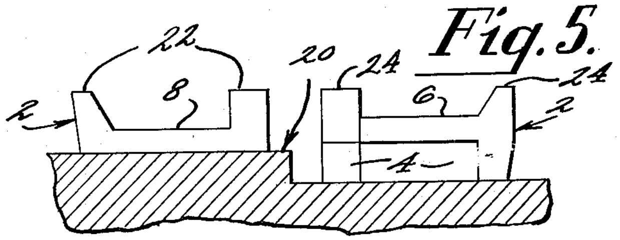
Fig. 5 is an elevational view, partially in section, illustrating a jig fixture for dressing the gap faces of the head element parts.

The severed core sections are then placed on a finishing jig 20 such as that represented in Fig. 5. With the core elements secured to the jig in the position shown in Fig. 5, the surfaces 22 and 24 determined by the severing of the elements are positioned for machining and lapping to provide a polished finish. These surfaces 22 and 24 will, when placed in face-to-face relation, determine a signal translating gap in the head elements. It may be seen that with the head elements produced in the manner thus far described, considerable accuracy may be exercised in the production of uniformly dimensioned parts. On each of the head elements such as shown in Fig. 4, the tab end of one of the non-magnetic spacer elements 12 and one of the lower tabs 4 of the next adjacent core lamination is removed as shown most clearly in Fig. 7.

Figure 6:
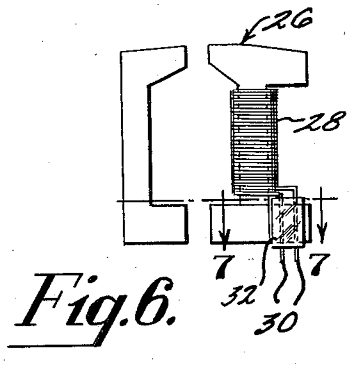
Fig. 6 is an elevational view of a completed head element ready to be assembled into a transducer unit in accordance with the present invention.
Figure 7:
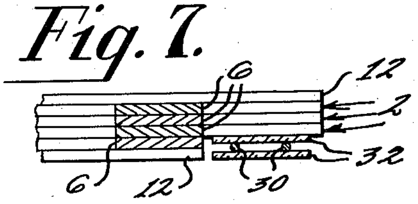
Fig. 7 is an enlarged fragmentary cross sectional view taken along the line 7—7 of Fig. 6 and viewed in the direction of the arrows.

Referring now particularly to Figs. 6 and 7, there is shown a transducer head element 26 comprised of a cemented stack of core lamination elements 2 and a pair of non-magnetic spacer elements 12. About the coil leg 6 of the head element there is placed a signal translating coil 28. The leads 30 for the signal coil 28 are sandwiched between a pair of sheet insulators 32 such, for example, as mica. The leads 30 together with the insulators 32 are positioned in the space left by the removal of the tab ends of the non-magnetic spacer and the one adjacent core lamination.

Figure 8:
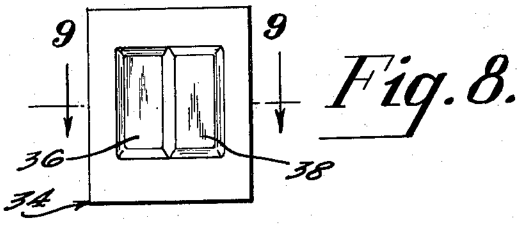
Fig. 8 is an elevational view of a unitary magnetic shield member which is positioned between the head elements of the magnetic record transducer unit according to the present invention.
Figure 9:
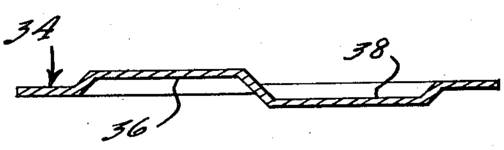
Fig. 9 is an enlarged cross sectional view of the member shown in Fig. 8 taken along the line 9—9 of that figure and viewed in the direction of the arrows.

In Figs. 8 and 9, there is shown a unitary magnetic shield member 34. This shield member may be punched from a sheet of magnetic material such, for example, as Mumetal and may be on the order of 0.004 of an inch in thickness. The shield member is substantially rectangular in shape and of a size commensurate with the size of the transducer head elements 26. The center portion of the shield member is given a reverse-curve contour such that a well or depression 36 is formed which occupies half of the center portion as viewed from one side of the shield member 34. A similar well or depression 38 is formed to occupy the other half of the center portion of the shield member and is oppositely directed from the first mentioned well or depression 36.

Figure 11:
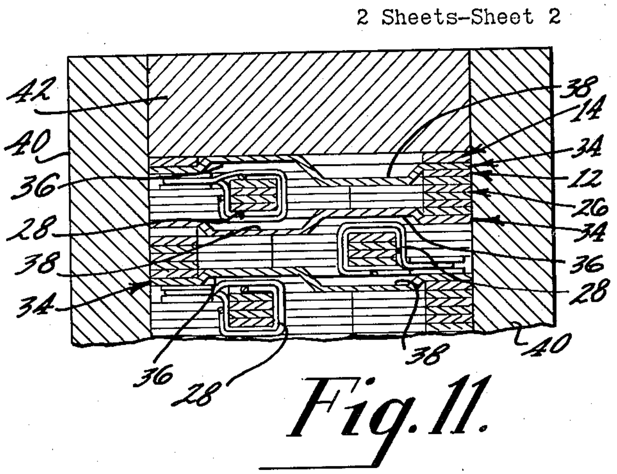
Fig. 11 is an enlarged, fragmentary, cross sectional view taken along the line 11—11 of Fig. 10 and viewed in the direction of the arrows.
Figure 10:
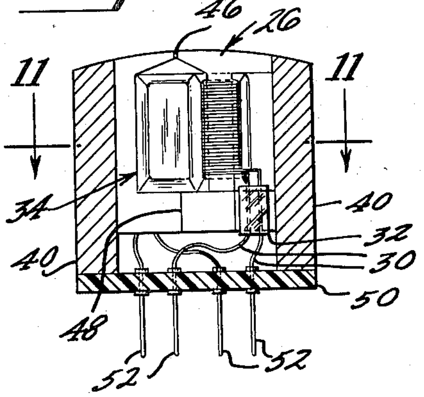
Fig. 10 is a view, partly in cross section, of a transducer unit embodying the present invention.
Figure 12:
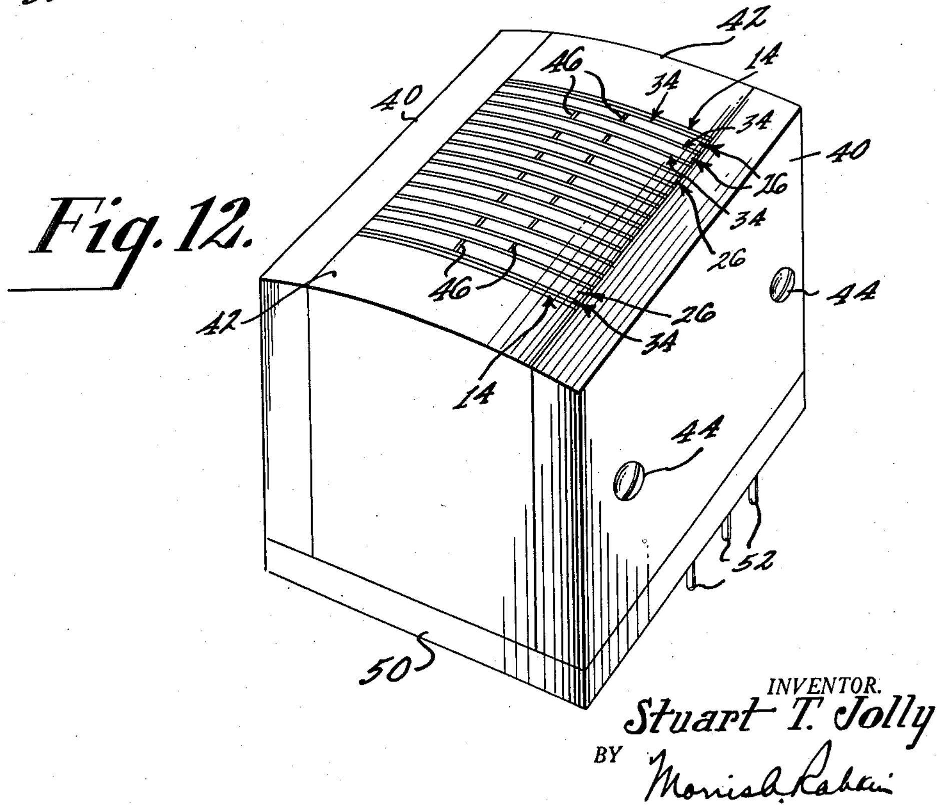
Fig. 12 is an enlarged perspective view of a magnetic record transducer unit embodying the present invention.

The assembly of the several parts thus far described is shown in Figs. 10, 11 and 12. The head elements 26 are assembled within a non-magnetic housing such, for example, as aluminum. The housing comprises a pair of side walls 40 and a pair of end members 42. Starting with one of the end members 42, there is placed, next in order, one of the non-magnetic end spacers 14. Next adjacent to the end spacer 14, there is positioned one of the magnetic shield members 34. It will be noted that the well or depression to which reference was made in the discussion of the magnetic shield members produces a bulge when viewed from the opposite side. The end spacer 14 with its central opening accommodates the bulge in the first shield member. Positioned next adjacent to the shield member is one of the transducer head elements 26. This head element is positioned with the signal translating coil nested within the depression 36 of the shield member 34. The oppositely directed bulge occasioned by the second depression 38 in the shield member lies within the open space defined by the head element 26. There is next positioned a second shield member 34. This shield member is oriented with its bulges or depressions oppositely directed from those of the first mentioned shield member. Thus, the coil 28 is substantially boxed or embraced within the depression of the two adjacent shield members while the two bulges are adjacent each other in line within the open space defined by the head element.

Next, a second head element 26 is positioned adjacent the second shield member. However, the I-shaped part or coil leg 6 of this head element is positioned adjacent the opposite side of the housing from that of the first head element. That is, the I-shaped part of the second head element is positioned next to the C-shaped part of the first head element. The tabs 4 of the I-shaped part of the head element 26 are so dimensioned, during the machining and dressing operation previously discussed, that the coil leg 6 together with its associated coil 28 lies opposite the opening defined by the C-shaped part of the next adjacent head element. In this manner, the coil 28 of the second head element 26 lies nested within the depression 36 of the second shield member 34. A third shield member is positioned next adjacent to the second head element. This third shield member 34 is oriented in the same direction as the first shield member. Following the procedure thus far described, a transducer unit is built up with as many head elements as are desired. Adjacent head elements will be positioned with their coil legs lying nearest opposite side walls 40 of the housing member and, as set forth, adjacent shield members positioned between the head elements are oriented with their adjacent wells or depressions oppositely directed.

It will be recalled that the rear surfaces of the head elements were machined to provide an indexing surface. The faces of the side walls are finished to provide a surface against which these indexing surfaces on the head elements may bear. A pair of clamping screws 44 are provided which couple the two side wall members 40 together. By tightening these screws 44, the head elements are clamped between the two side walls 40 providing accurate positioning and orientation of the inner faces of the head element parts which define the non-magnetic gaps 46 and 48 in the magnetic path provided by the core laminations. The upper one of these gaps 46 constitutes a signal translating gap. It will be appreciated that a suitable non-magnetic gap spacer may be provided in this signal translating gap. A suitable material for such a gap spacer might be, for example, beryllium copper on the order of 0.001 of an inch in thickness. The leads 30 from the several signal translating coils 28 are suitably secured to external terminals in a non-magnetic, non-conductive base member 50. The terminals may, for example, comprise plug pins 52 as illustrated. In the illustrated assembly, the opposite orientation of adjacent head elements produce a staggered arrangement of the signal translating gaps. This feature has been found to be advantageous in the avoidance of error signals due to a transverse flaw in a magnetic tape record with which the transducer unit may be used. When such a transducer unit is employed in computing apparatus, the signals may be applied simultaneously to two of the head elements in the manner shown in U. S. Patent 2,689,274 issued to W. Saeger.

There has thus been provided an improved magnetic record transducer unit for use with multitrack magnetic records, which is characterized by accuracy in construction and minimization of interchannel signal linkages.

What is claimed is:

1. A magnetic record transducer unit comprising a plurality of head elements arranged for cooperation with a plurality of parallel record tracks on a magnetic record medium, each of said head elements defining substantially a hollow plane figure, a signal coil on one portion of each of said head elements, adjacent ones of said head elements being oppositely disposed with respect to each other, indexing means on said oppositely disposed head elements whereby said portion carrying said coil of each of said head elements is positioned adjacent the hollow defined by the adjacent head element, and a unitary magnetic shield member positioned between adjacent ones of said head elements.

2. A magnetic record transducer unit comprising a plurality of head elements arranged for cooperation with a plurality of parallel record tracks on a magnetic record medium, each of said head elements defining substantially a hollow rectangle, a signal coil mounted on one leg of said rectangle, adjacent ones of said head elements being oppositely disposed with respect to each other, indexing means on said oppositely disposed head elements whereby said leg carrying said coil on each of said head elements is positioned adjacent the hollow defined by the adjacent head element, and a unitary magnetic shield member positioned between adjacent ones of said head elements, said unitary shield members having the central portion thereof contoured to at least partially embrace said signal coils between adjacent ones of said shield members.

3. A magnetic record transducer unit comprising a plurality of head elements arranged for cooperation with a plurality of parallel record tracks on a magnetic record medium, each of said head elements comprising a magnetic core portion and non-magnetic spacer means, said head elements defining substantially a hollow rectangle, a signal coil mounted on one leg of said rectangle, adjacent ones of said head elements being oppositely disposed with respect to each other, indexing means on said oppositely disposed head elements whereby said leg carrying said coil on each of said head elements is positioned adjacent the hollow defined by the adjacent head element, and a unitary magnetic shield member positioned between adjacent ones of said head elements, said unitary shield member being coextensive with said head elements and having the central portions thereof contoured to at least partially embrace said signal coils between adjacent ones of said shield members.

4. A magnetic record transducer unit comprising a plurality of head elements arranged for cooperation with a plurality of parallel record tracks on a magnetic record medium, each of said head elements comprising a magnetic core portion and non-magnetic spacer means, said head elements defining substantially a hollow rectangle, a signal coil mounted on one leg of said rectangle, adjacent ones of said head elements being oppositely disposed with respect to each other, indexing means on said oppositely disposed head elements whereby said leg carrying said coil on each of said head elements is positioned adjacent the hollow defined by the adjacent head element, and a unitary magnetic shield member positioned between adjacent ones of said head elements, said unitary shield member having the central portion thereof provided with a reverse-curve contour to at least partially embrace said signal coils between adjacent ones of said shield members.

5. A magnetic record transducer unit comprising a plurality of transducer head elements arranged for cooperation with a plurality of parallel record tracks on a magnetic record medium, each of said head elements comprising a two-part structure having a laminated magnetic core and non-magnetic spacer members, one part of the two-part structure being substantially I-shaped, the other part of said two part structure being substantially C-shaped, a signal coil mounted on said I-shaped part, mounting means for supporting said plurality of head elements with said two parts of each of said head elements positioned in face-to-face relation to define a signal translating gap in each of said head elements, adjacent ones of said head elements being oppositely disposed with a C-shaped part of each of said head elements being positioned adjacent to an I-shaped part of the next adjacent head element, said signal coil on each of said I-shaped parts being adjacent the opening defined by said adjacent C-shaped parts, and a unitary magnetic shield member positioned between adjacent ones of said head elements.

6. A magnetic record transducer unit comprising a plurality of transducer head elements arranged for cooperation with a plurality of parallel record tracks on a magnetic record medium, each of said head elements comprising a two-part structure having a laminated magnetic core and non-magnetic spacer members, one part of said two-part structure being substantially I-shaped, the other part of said two-part structure being substantially C-shaped, a signal coil mounted on said I-shaped part, mounting means for supporting said plurality of head elements with said two parts of each of said elements positioned in face-to-face relation to define a signal translating gap in each of said head elements, adjacent ones of said head elements being oppositely disposed with a C-shaped part of each of said head elements being positioned adjacent to an I-shaped part of the next adjacent head element, said signal coil on each of said I-shaped parts being adjacent the opening defined by said adjacent C-shaped parts, and a unitary magnetic shield member positioned between adjacent ones of said head elements, said unitary shield member having the central portion thereof provided with a reverse-curve contour to at least partially embrace said signal coils between adjacent ones of said shield members.

References Cited in the file of this patent

UNITED STATES PATENTS

| | | |
|---|---|---|
| 2,689,274 | Saeger | Sept. 14, 1954 |
| 2,732,275 | MacNeill | Jan. 24, 1956 |
| 2,756,280 | Rettinger | July 24, 1956 |
| 2,769,866 | Kornei | Nov. 6, 1956 |